Jan. 31, 1950        G. H. MESSMORE        2,496,171
TRANSPARENT-EFFECT DISPLAY

Filed Nov. 16, 1946        2 Sheets-Sheet 1

INVENTOR.
GEORGE H. MESSMORE
BY
ATTORNEY.

Jan. 31, 1950  G. H. MESSMORE  2,496,171
TRANSPARENT-EFFECT DISPLAY
Filed Nov. 16, 1946  2 Sheets-Sheet 2

INVENTOR.
GEORGE H. MESSMORE
By Edward Gotwen
ATTORNEY.

Patented Jan. 31, 1950

2,496,171

UNITED STATES PATENT OFFICE 2,496,171

TRANSPARENT-EFFECT DISPLAY

George H. Messmore, New York, N. Y.

Application November 16, 1946, Serial No. 710,282

4 Claims. (Cl. 40—126)

This invention relates to new and useful improvements in transparent-effect displays.

More particularly, the invention proposes a display which is characterized by rapidly moving strips which will give the appearance or sensation of a transparent body. Heretofore many displays called for large transparent bodies. Bodies of this type in the past were made of glass, and in recent years, if sufficiently small, of transparent thermoplastic or thermo-setting materials. However, these constructions are very high in cost if the display models are large, as for example, displays for large store windows, exhibitions, and the like. The rapidly moved strips, in accordance with this invention, give the appearance or sensation of a transparent body and may be manufactured at a relatively low cost.

More specifically, the invention is adapted to produce various transparent shapes. By way of illustration, one form of the invention has been disclosed in which the transparent body is of Zeppelin or rocket shape. In another form of the invention the transparent body is spherical.

The invention also proposes to associate one or more display supports with each of the transparent-effect bodies for supporting various display objects. These display supports and objects may be arranged interior of or exterior of, or both interior and exterior of the transparent-effect body.

The invention also proposes that the display supports be movable and preferably driven in a predetermined motion.

Another object of this invention is to mount the plurality of spaced strips which produce the transparent-effect body when rapidly moved upon a tubular member rotatively mounted and adapted to be driven. It is furthermore proposed to pass a rod through said tubular member and to mount the display support upon said rod within the interior of the transparent-effect body, or upon its exterior, as desired.

Another object of the invention is the construction of a device as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Figure 1:
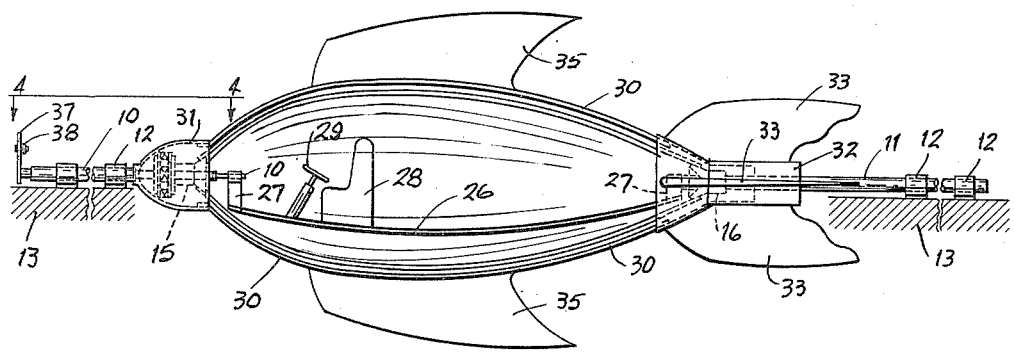
Fig. 1 is a side elevational view of a transparent-effect display illustrated as it would appear during operation in which the transparent-effect body of the display is seen.
Figure 2:
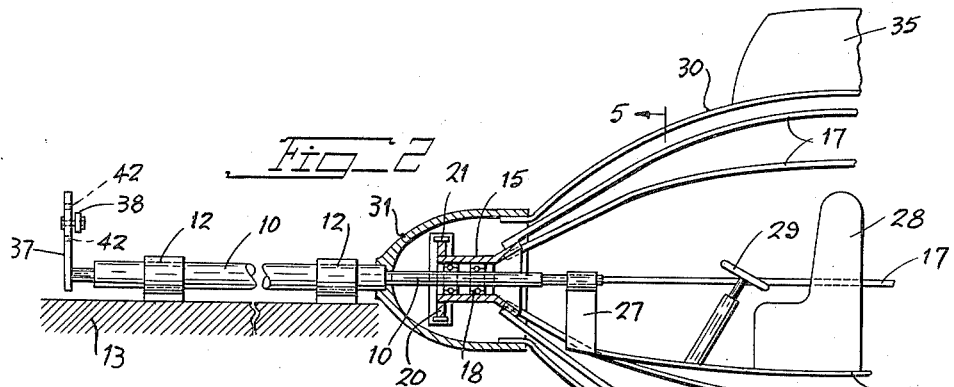
Fig. 2 is a fragmentary enlarged longitudinal sectional view of the front end of the display shown in Fig. 1, this time illustrated in a stationary position.
Figure 3:
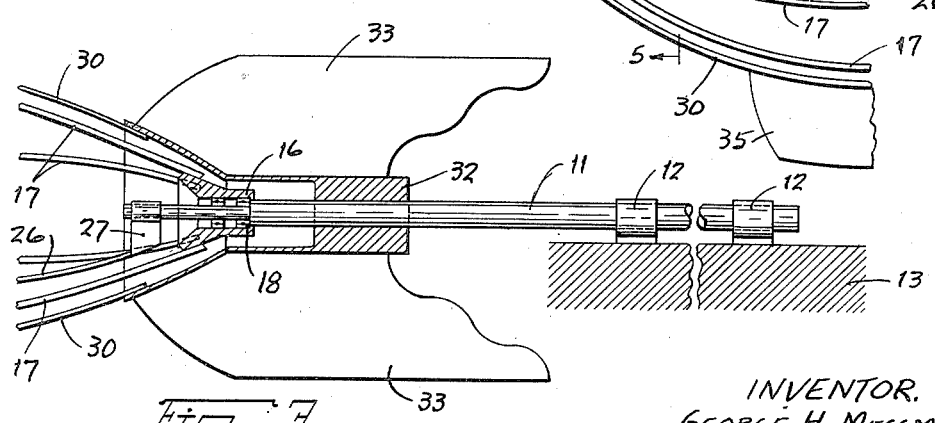
Fig. 3 is a fragmentary enlarged longitudinal vertical sectional view of the other end of the display shown in Fig. 1, illustrated in a stationary position.
Figures 4, 5:
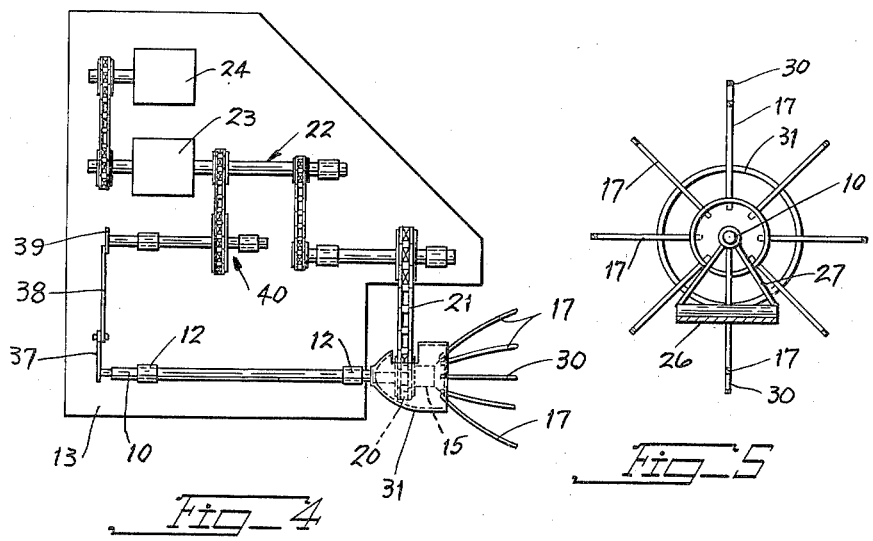
Fig. 4 is a fragmentary plan view looking in the direction of the line 4—4 of Fig. 1.
Fig. 5 is a vertical sectional view taken on the line 5—5 of Fig. 2.

The transparent-effect display, as illustrated in Figs. 1–5 inclusivee, includes a pair of axially spaced and aligned rods 10 and 11. These rods are rotatively supported in bearings 12 which are mounted on suitable supports 13. Tubular members 15 and 16 are respectively mounted on the rods 10 and 11. A plurality of spaced strips 17 are mounted between the tubular members 15 and 16 to form a transparent-effect body when said tubular members are rotated. The strips 17, in the particular design of the invention illustrated are curved to simulate a rocket or zeppelin when the display is operated. The tubular members 15 and 16 are rotatively mounted on the rods 10 and 11, respectively, with ball bearings 18.

Drive means is associated with the tubular members 15 and 16 by which they may be driven. This drive means comprises a drive for one of the tubular members, namely, the tubular member 15. The strips 17 are of rigid material capable of transmitting the rotative motion from the tubular member 15 to the tubular member 16. The drive of the tubular member 15 includes a sprocket wheel 20 on the tubular member 15 engaged by a sprocket chain 21 of a drive system 22 connected with a speed reduction transmission 23 driven by an electric motor 24.

A display support 26 is mounted upon the rods 10 and 11. This display support 26 is supported by brackets 27 at its ends which are rigidly attached to the inner ends of the rods 10 and 11. The support 26 is intended to hold various display objects. For example, a driver's seat 28, a steering gear 29, and many additional objects, such as toys and the like, if the display is to represent a Christmas scene. The display support 26 must be located in the vicinity of the plurality of spaced strips 17. In the particular design of the invention shown in Figs. 1–5, the support 26 is located within the compass of the strips 17. Additional display supports are located outside of the compass of the strips 17. These additional display supports are in the nature of arcuate strips 30 spaced slightly outwards of the strips 17 and supported at their ends upon collars 31 and 32 fixedly mounted on the rods 10 and 11, respectively. The collar 31 is fashioned or shaped to represent the front point of a rocket. It also serves as a cover to encase the tubular member 15. The back collar 32 is provided with fins 33 simulating the tail of a rocket. The collar 32 has a front portion which encases and conceals the tubular member 16. The arcuate strips 30 are provided with fins 35 representing the fins of a rocket. It should be borne in mind that other effects necessary to make the rocket look genuine may be applied.

The rods 10 and 11 are associated with means for moving them for the purpose of moving the display supports 26 and 30. This means comprises a drive connected with the rod 10. The drive comprises a radial arm 37 mounted on the outer end of the rod 10 and pivotally connected with a connecting link 38 which is connected eccentrically on a drive disc 39 connected with a drive mechanism 40, in turn connected with the transmission 22. The radial arm 37 is provided with a plurality of radially spaced openings 42 with which the end of the connecting link 38 may be connected so that the amplitude of oscillation of the rod 10 may be varied, as desired.

The operation of the transparent-effect display may be understood from the following:

Rotations from the motor 24 are transmitted to drive the tubular member 15 which rotates the plurality of spaced strips 17, which in turn rotates the tubular member 16. The rotating spaced strips 17 are driven at such a rate that they will give the effect of a transparent body. It will be possible to look through this transparent-effect body and see the objects in its interior. Rotations of the motor 24 will also be transmitted to the disc 39, and hence to the connecting link 38 and radial lever 37, which will be oscillated backwards and forwards. This will oscillate the rod 10 and the display supports 26 and 30. This oscillation will give the appearance that the display support 26 and the object 28, 29, etc. on it, and the fins 35 and tail 33 are undulating as the rocket is in flight.

Figure 6:
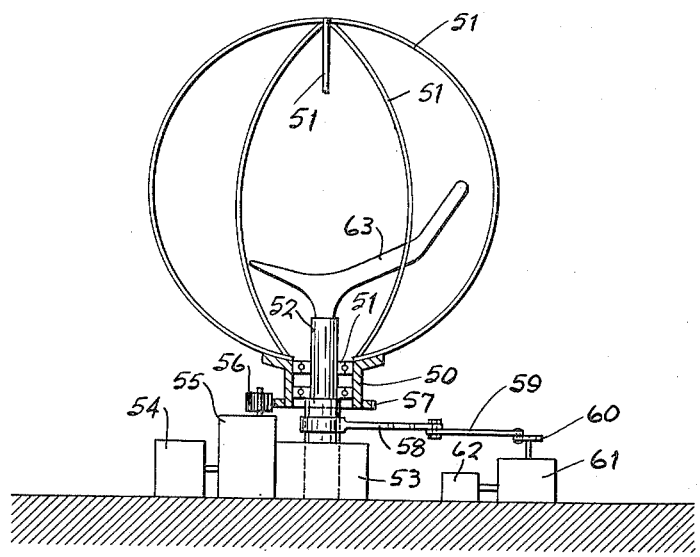
Fig. 6 is an elevational view of a transparent-effect display constructed in accordance with a modified form of this invention, certain parts being broken away to disclose interior parts.

In Fig. 6 another embodiment of the invention has been disclosed which, in principal is identical to the prior form, but in construction and operation somewhat different. In this form of the invention the transparent-effect display includes a tubular member 50. A plurality of spaced strips 51 are mounted on this tubular member 50 and are adapted to form a spherical transparent-effect body when the tubular member 50 is rotated. The tubular member 50 is rotatively supported by ball bearings 51 on a rod 52 which passes through the tubular member 50. The rod 52 is turnably supported at its bottom end in a bearing 53. An electric motor 54 drives a speed reduction transmission 55 which is provided with a driven pinion 56 engaging a gear 57 on the tubular member 50. The rod 52 is provided with a radial arm 58 which is connected with a connecting link 59, which in turn is connected eccentrically upon a disc 60 which is rotatively driven by speed reduction transmission 61 operated by an electric motor 62. A display support 63 is supported upon the rod 52.

The operation of this transparent-effect display may be understood from the following:

Rotations from the electric motor 54 are transmitted to rotate the tubular member 50, which in turn rotates the plurality of spaced strips 51, giving an effect which looks like a transparent sphere. Display objects may be placed on the display support 63 and may be clearly seen through the transparent-effect sphere of the rotating strips 51.

Rotations from the motor 62 will be transmitted to drive the disc 60, which in turn reciprocates the connecting link 59 which oscillates the radial arm 58 to oscillate the rod 52 and the display support 63 mounted thereon.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A transparent-effect display, comprising a pair of axially spaced and aligned rods, means for turnably supporting said rods, tubular members rotatively mounted on said rods, spaced strips mounted between said tubular members and spaced from each other and extending longitudinally and radially away from said tubular members in order to form a transparent-effect body when said tubular members rotate, means for driving at least one of said tubular members, a display support mounted on at least one of said rods and located in the vicinity between said spaced strips in order to be positioned within said transparent-effect body, and means for moving said rod with said display support for moving said display support within said transparent-effect body.

2. A transparent-effect display, comprising a pair of axially spaced and aligned rods, means for turnably supporting said rods, tubular members rotatively mounted on said rods, spaced strips mounted between said tubular members and spaced from each other and extending longitudinally and radially away from said tubular members in order to form a transparent-effect body when said tubular members rotate, means for driving at least one of said tubular members, a display support mounted on at least one of said rods and located in the vicinity between said spaced strips in order to be positioned within said transparent-effect body, and means for moving said rod with said display support for moving said display support within said transparent-effect body of said rods, comprising a drive mechanism provided with a connecting link, and a radial arm on said latter-mentioned rod connected with said connecting link so as to transmit oscillations to said latter-mentioned rod.

3. A transparent-effect display, comprising a tubular member, means for axially rotating said tubular member, a plurality of strips spaced from each other around said tubular member and mounted on and extending longitudinally and radially away from said tubular member in order to form a transparent-effect body when said tubular member is rotated, a rod passing through said tubular member and extending into the space radially within said strips in order to be positioned within said transparent-effect body, a display support supported on said rod within said transparent-effect body, and means for moving said rod in order to move said display support within said transparent-effect body.

4. A transparent-effect display, comprising a tubular member, means for axially rotating said tubular member, a plurality of strips spaced from each other around said tubular member and mounted on and extending longitudinally and radially away from said tubular member in order to form a transparent-effect body when said tubular member is rotated, a rod passing through said tubular member and extending into the space radially within said strips in order to be positioned within said transparent-effect body, a display support supported on said rod and having a section within said transparent-effect body and another section outside of said transparent-effect body, and means for moving said rod in order to move said sections of said display support.

GEORGE H. MESSMORE.

REFERENCES CITED

The following references are of record in the file of this patent:

UNITED STATES PATENTS

| Number | Name | Date |
|---|---|---|
| 1,124,794 | Otstot | Jan. 12, 1915 |
| 1,631,272 | Kielar | June 7, 1927 |
| 2,134,150 | Schmidt | Oct. 25, 1938 |